United States Patent
Cai et al.

(10) Patent No.: US 10,374,930 B2
(45) Date of Patent: Aug. 6, 2019

(54) OFF-PEAK PATCHING FOR ENTERPRISE STABILITY

(71) Applicant: Microsoft Technology Licensing, LLC, Redmond, WA (US)

(72) Inventors: Jianfeng Cai, Redmond, WA (US); Dexter Dauz, Sammamish, WA (US); Brad Smith, Sammamish, WA (US); Zohar Raz, Redmond, WA (US); Neetha Tuluri, Sammamish, WA (US); Nick Alfeo, Seattle, WA (US); Roshane Silva, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/009,809

(22) Filed: Jan. 28, 2016

(65) Prior Publication Data

US 2017/0222910 A1 Aug. 3, 2017

(51) Int. Cl.
*H04L 29/06* (2006.01)
*H04L 12/26* (2006.01)
*H04L 29/08* (2006.01)

(52) U.S. Cl.
CPC ............ *H04L 43/16* (2013.01); *H04L 67/325* (2013.01); *H04L 67/34* (2013.01)

(58) Field of Classification Search
CPC ................................. H04L 67/42; H04L 43/16
See application file for complete search history.

(56) References Cited

U.S. PATENT DOCUMENTS

| | | |
|---|---|---|
| 7,895,592 B2 | 2/2011 | Subramanian et al. |
| 8,261,353 B2 | 9/2012 | Hirsave et al. |
| 8,521,853 B2 | 8/2013 | Rathunde et al. |

(Continued)

FOREIGN PATENT DOCUMENTS

| | | |
|---|---|---|
| CN | 102662764 A | 9/2012 |
| WO | 2016048393 A1 | 3/2016 |

OTHER PUBLICATIONS

"Multiple Datacenter Deployment Guidance", Available at: <<https://msdn.microsoft.com/en-us/library/dn589779.aspx>>, Mar. 6, 2014, 7 pages.

(Continued)

*Primary Examiner* — Adnan M Mirza
(74) *Attorney, Agent, or Firm* — NovoTechIP International PLLC

(57) ABSTRACT

In one example, a server farm patching system may wait until fewer users are accessing a server farm to apply a patch code set to a server application executed by a server at the server farm. The server farm patching system may identify an off-peak usage time range for a server farm describing when the server farm has an activity level below an activity threshold. The server farm patching system may apply a patch code set at an off-peak usage patching aggressiveness level indicating an off-peak upper bound percentage of servers in the server farm receiving the patch code set when within the off-peak usage time range. The server farm patching system may apply the patch code set at a peak usage patching aggressiveness level indicating a peak upper bound percentage of servers in the server farm receiving the patch code set when outside the off-peak usage time range.

20 Claims, 13 Drawing Sheets

(56) References Cited

U.S. PATENT DOCUMENTS

| | | |
|---|---|---|
| 8,606,897 B2 | 12/2013 | Ferris et al. |
| 8,612,615 B2 | 12/2013 | Ferris et al. |
| 8,756,318 B1 | 6/2014 | Reus et al. |
| 8,799,888 B1 | 8/2014 | Fitzgerald et al. |
| 8,869,135 B1 | 10/2014 | Fitzgerald et al. |
| 9,086,940 B2 | 7/2015 | Weckwerth et al. |
| 9,189,224 B2 | 11/2015 | Ravi |
| 9,189,285 B2 | 11/2015 | Ng et al. |
| 9,202,225 B2 | 12/2015 | Ferris et al. |
| 9,734,349 B1 | 8/2017 | Prafullchandra et al. |
| 2006/0080656 A1 | 4/2006 | Cain et al. |
| 2011/0126168 A1 | 5/2011 | Ilyayev |
| 2011/0231552 A1 | 9/2011 | Carter et al. |
| 2012/0131161 A1 | 5/2012 | Ferris et al. |
| 2012/0131174 A1 | 5/2012 | Ferris et al. |
| 2012/0131594 A1 | 5/2012 | Morgan |
| 2012/0239739 A1 | 9/2012 | Manglik et al. |
| 2012/0311154 A1 | 12/2012 | Morgan |
| 2014/0122594 A1 | 5/2014 | Uzunalioglu et al. |
| 2015/0012624 A1* | 1/2015 | Geiger ............... H04L 41/082 709/221 |
| 2015/0058822 A1* | 2/2015 | Elias ..................... G06F 8/75 717/123 |
| 2015/0089488 A1 | 3/2015 | Anderson et al. |
| 2015/0106512 A1 | 4/2015 | Cama et al. |
| 2015/0199191 A1 | 7/2015 | Bhasin et al. |
| 2015/0237114 A1 | 8/2015 | McGrath |
| 2015/0242199 A1 | 8/2015 | Goldstein et al. |
| 2015/0256412 A1 | 9/2015 | Dominick et al. |
| 2017/0222948 A1* | 8/2017 | Washbrook ............ H04L 47/70 |
| 2018/0097694 A1 | 4/2018 | Raz et al. |

OTHER PUBLICATIONS

"Autoredeploy", Available at: https://docs.docker.com/docker-cloud/apps/auto-redeploy/, Retrieved on: Aug. 11, 2016, 2 Pages.

"Controlling Access to Adobe Creative Cloud Services", Available at: https://www.adobe.com/content/dam/acom/en/devnet/creativesuite/pdfs/ControllingSvcAccess.pdf, May 2013, 8 Pages.

"Non Final Office Action Issued in U.S. Appl. No. 15/283,255", dated Apr. 26, 2018, 14 Pages.

"Notice of Allowance Issued in U.S. Appl. No. 15/283,255", dated Oct. 22, 2018, 13 Pages.

\* cited by examiner

100

200

| CODE ID 910 | VERSION 920 | PATCH CODE SET 930 | GEO 940 | AGE 950 | REGRESSION HISTORY 960 |
|---|---|---|---|---|---|

*900*
Figure 9

| FARM ID 1010 | SERVER ID 1020 | GEO 1030 | SINGLE TENANT FLAG 1040 | OFF-PEAK START 1050 | OFF-PEAK STOP 1060 | TEMP 1070 |
|---|---|---|---|---|---|---|

*1000*
Figure 10

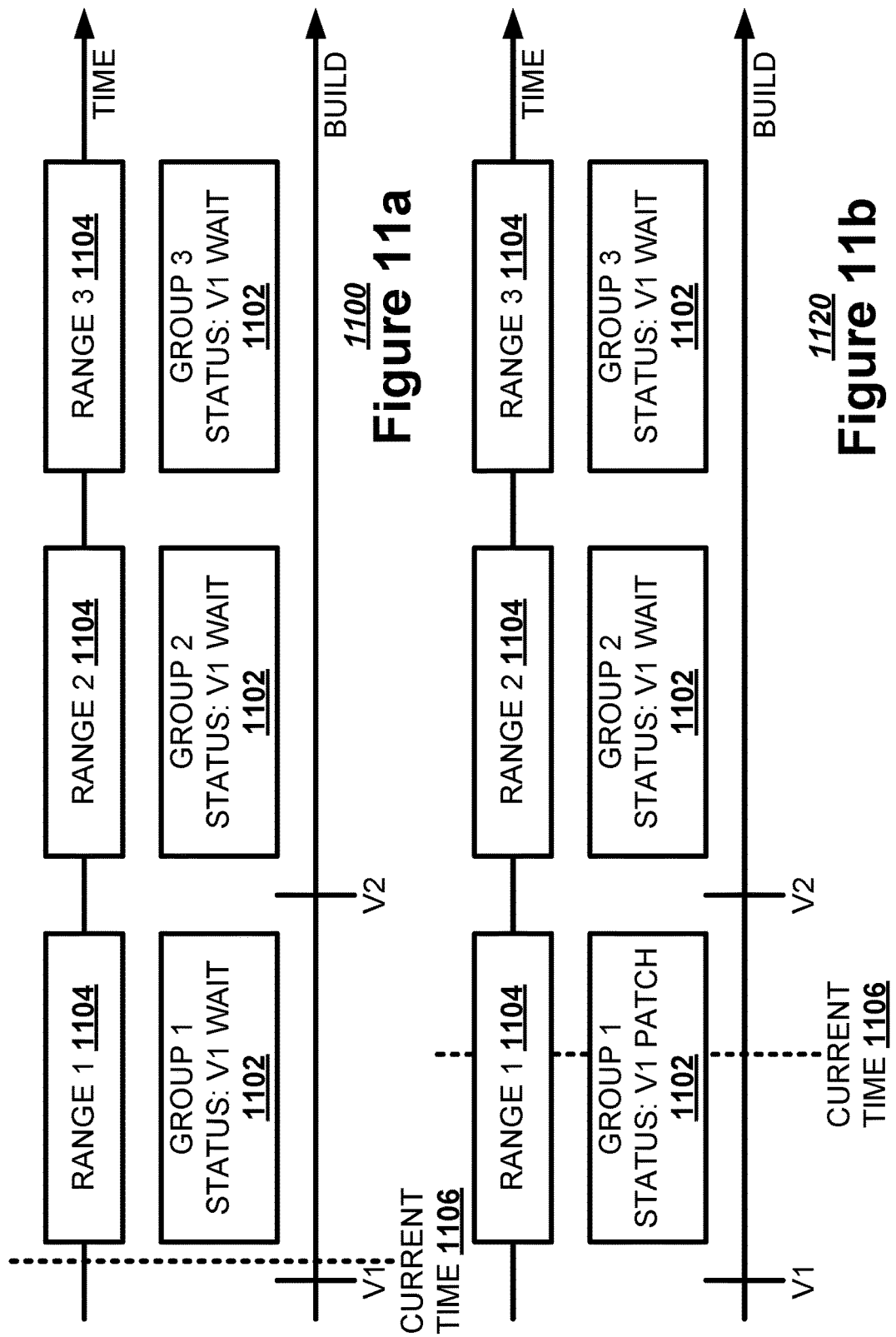

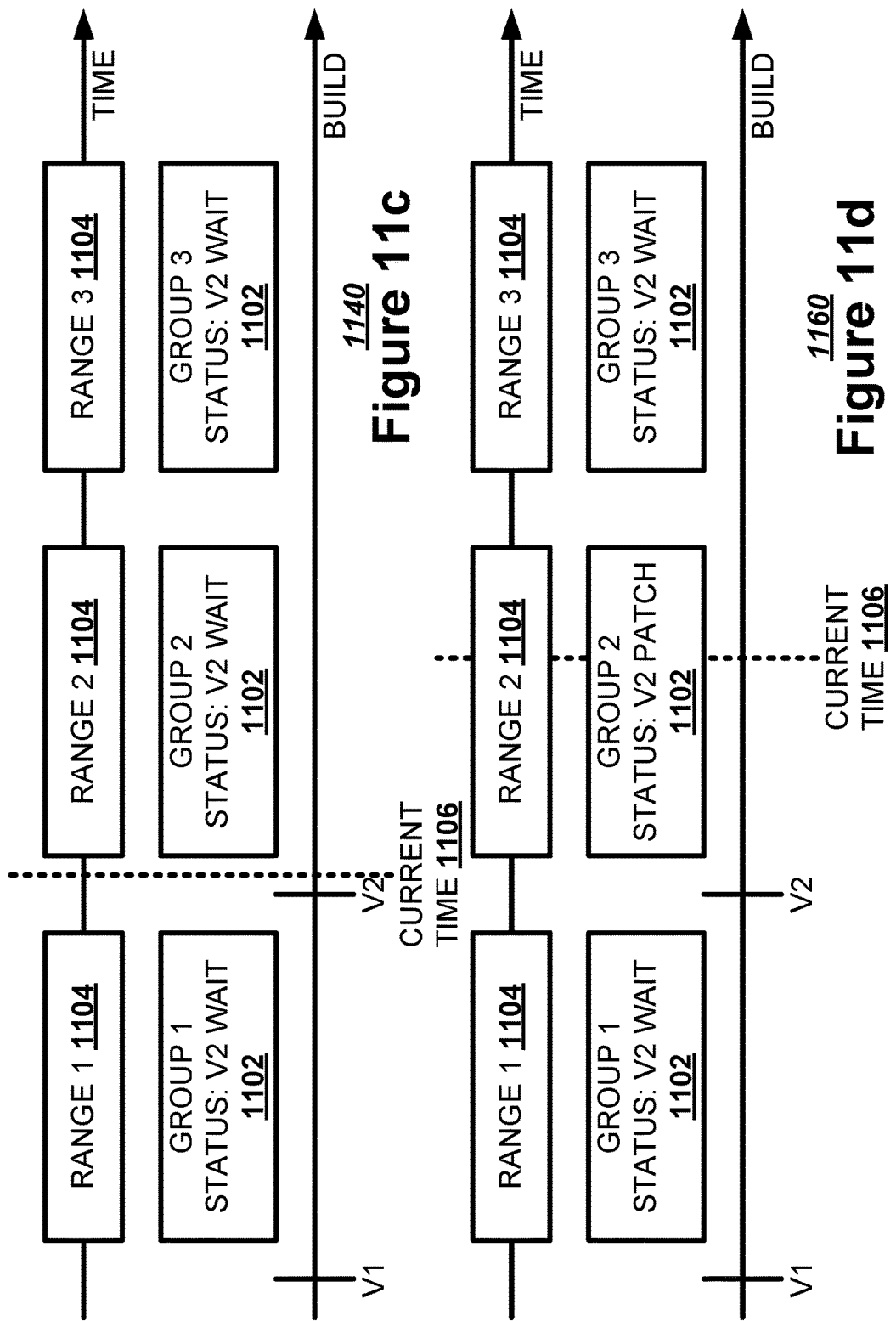

10,374,930 B2

OFF-PEAK PATCHING FOR ENTERPRISE STABILITY

BACKGROUND

A network service may allow multiple users to interact with data or an application via a data network. The data may be content on a website or a multi-share data file, accessible to be edited by multiple users. The application may be a software as a service application that a user purchases a yearly subscription to use. The user may use a client device to interact with the network service using a native application that interacts with the network service or a multi-purpose application, such as a web browser, that may retrieve the data. The network service may be maintained on the back end of a data connection with the client device by a set of servers, referred to as a server farm.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to patching a server farm by waiting until fewer users are accessing a server farm to apply a patch code set to a server application executed by a server at the server farm. The server farm patching system may identify an off-peak usage time range for a server farm describing when the server farm has an activity level below an activity threshold. The server farm patching system may apply a patch code set at an off-peak usage patching aggressiveness level indicating an off-peak upper bound percentage of servers in the server farm receiving the patch code set when within the off-peak usage time range. The server farm patching system may apply the patch code set at a peak usage patching aggressiveness level indicating a peak upper bound percentage of servers in the server farm receiving the patch code set when outside the off-peak usage time range.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 9 illustrates, in a block diagram, one example of a patching code package.

FIG. 10 illustrates, in a block diagram, one example of a network container object.

FIGS. 11a-e illustrate, in timelines, one example of a patching timeline.

Figure 12:
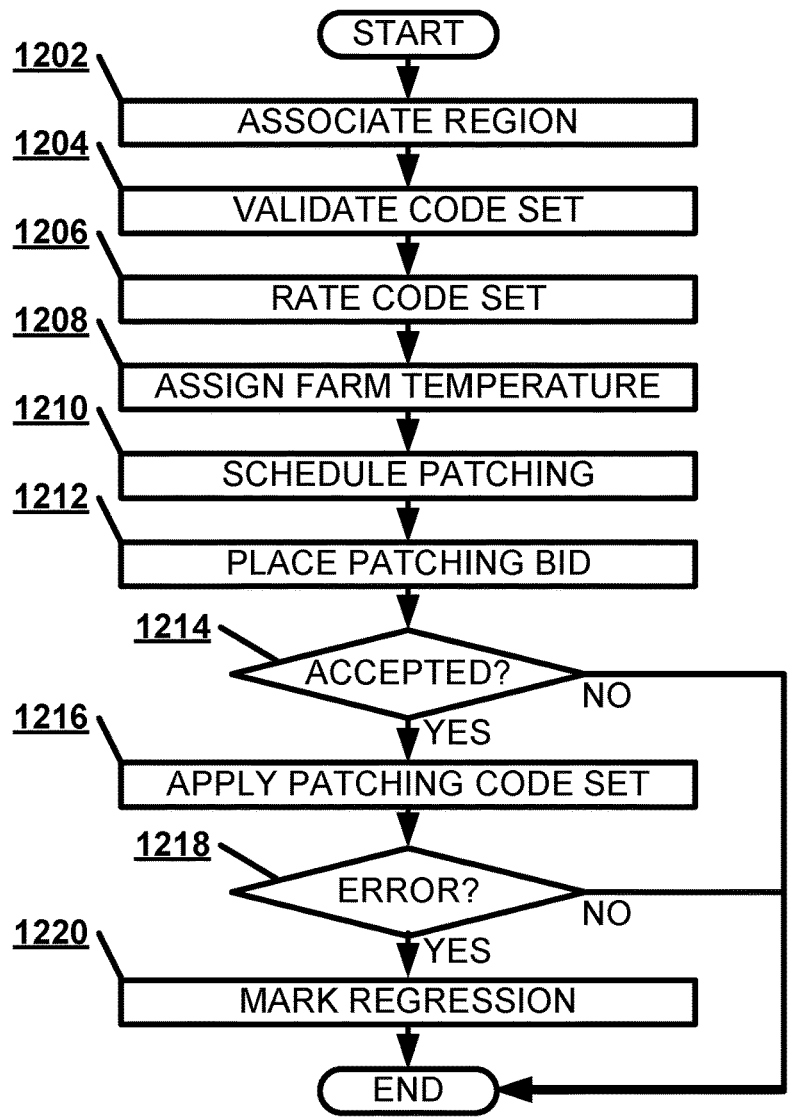

FIG. 12 illustrates, in a flowchart, one example of a method for applying a patch code set to a server.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a server farm patching system, a computing device, or a machine-implemented method.

In one example, a server farm patching system may wait until fewer users are accessing a server farm to apply a patch code set to a server application executed by a server at the server farm. A patch is a piece of software code added to a server application, possibly to add features, correct security vulnerabilities, or fix bugs. The server farm patching system may identify an off-peak usage time range for a server farm describing when the server farm has an activity level below an activity threshold. The server farm patching system may apply a patch code set at an off-peak usage patching aggressiveness level indicating an off-peak upper bound percentage of servers in the server farm receiving the patch code set when within the off-peak usage time range. The server farm patching system may apply the patch code set at a peak usage patching aggressiveness level indicating a peak upper bound percentage of servers in the server farm receiving the patch code set when outside the off-peak usage time range.

Applying a patch code set to a server farm may result in some impact on the performance and stability of the machines being updated. These impacts may have a negative effect on users using the network service provided by the server farm at the time, for both information technology workers and end-users. These changes may be particularly disruptive, and affect a large number of users, when applied during the peak business hours of the customer, as the number of users and the service load are at the highest. In addition to performance and stability issues, any behavior changes introduced by the patch may disrupt a workflow of the user.

A server farm patching system may alleviate these issues by performing patching during off-peak times for a given customer's region. When a new patch build is ready to be deployed to the server farm, the server farm patching system may first check which customers are in an off-peak usage time and limit the deployment of the patch to those customers. As an off-peak usage time begins for other customers, the server farm patching system may automatically deploy the patch to those customers as well. In this way, the server farm patching system may prevent a customer from having workflow disrupted by a patch during peak business hours while still guaranteeing that the customer receives the patch. Additionally, the separation of regions allows the server farm patching system to deploy more recent fixes by automatically using the optimum available validated build.

The server farm patching system may be a separate application that applies the patch code set or a self-deploying instance of the patch code set. The server farm patching system may determine a safe time to deploy a patch code set, and conversely a dangerous time to deploy the patch code set, by using a network container object describing server farms within a particular geographical region. The network container object may declaratively define the off-peak usage time for the region by listing an off-peak usage start time and off-peak usage end time. An administrator for a server farm network may set the off-peak usage time range manually, based on an analysis of request-per-second reports to find the times when server farm usage in the network is minimal. Alternately, the server farm patching system may automatically and dynamically set these values based on real time analysis of a request-per-second reports, removing yet another manual step and further increasing customer safety and experience.

Each region may deploy the patch code set to the server farms in the region completely independent of other regions. The server farm patching system may split a global patch code set into separate instances of that same code tailored to a region and associated with a parameter identifying that region. Using this parameter, the server farm patching system may create a list of server farms to patch before the deployment is successfully accomplished. By construction, each farm may belong to the same region with the same off-peak usage start time and off-peak usage end time. The server farm patching system may evaluate whether the current time falls within the off-peak usage time range. If this check indicates the region is in fact off-peak, the server farm patch code may patch the server farms in the region in a coordinated rollout manner. Once deployment is complete for each of the farms, the server farm patching system may exit, without consideration of the other regions. The server farm patching systems in the other regions may behave similarly.

At the time each region is ready to patch, the server farm patching system may automatically use the optimal available build. The server farm patching system may consider the age of a build and the quality of the build. The server farm patching system may prefer a newer build over an older build. Further, server farm patching system may determine build quality by identifying any known regressions in the build. The server farm patching system may apply a bidding process to determine the chosen build. As each new build becomes available, the server farm patching system may create an instance of patching for that region. The server farm patching system may wait until the build has been properly validated in previous environments. The server farm patching system may place a bid for the patching code set to receive ownership of the region. The server farm patching system may determine whether the region is patching. If so, the server farm patching system may delay evaluation of the bid. If the region is not patching, upon a new build becoming available, the server farm patching system may compare previous bids in the region. If a bid for a build is better than the other bids, the rejected bids may exit upon being deemed out of date to allow the newer instance to proceed. The server farm patching system may claim ownership of patching the region using the build with the best bid. The server farm patching system may also check whether a patch code set has been marked as having a regression, with the regressed patch code set exiting from contention.

Figure 1:
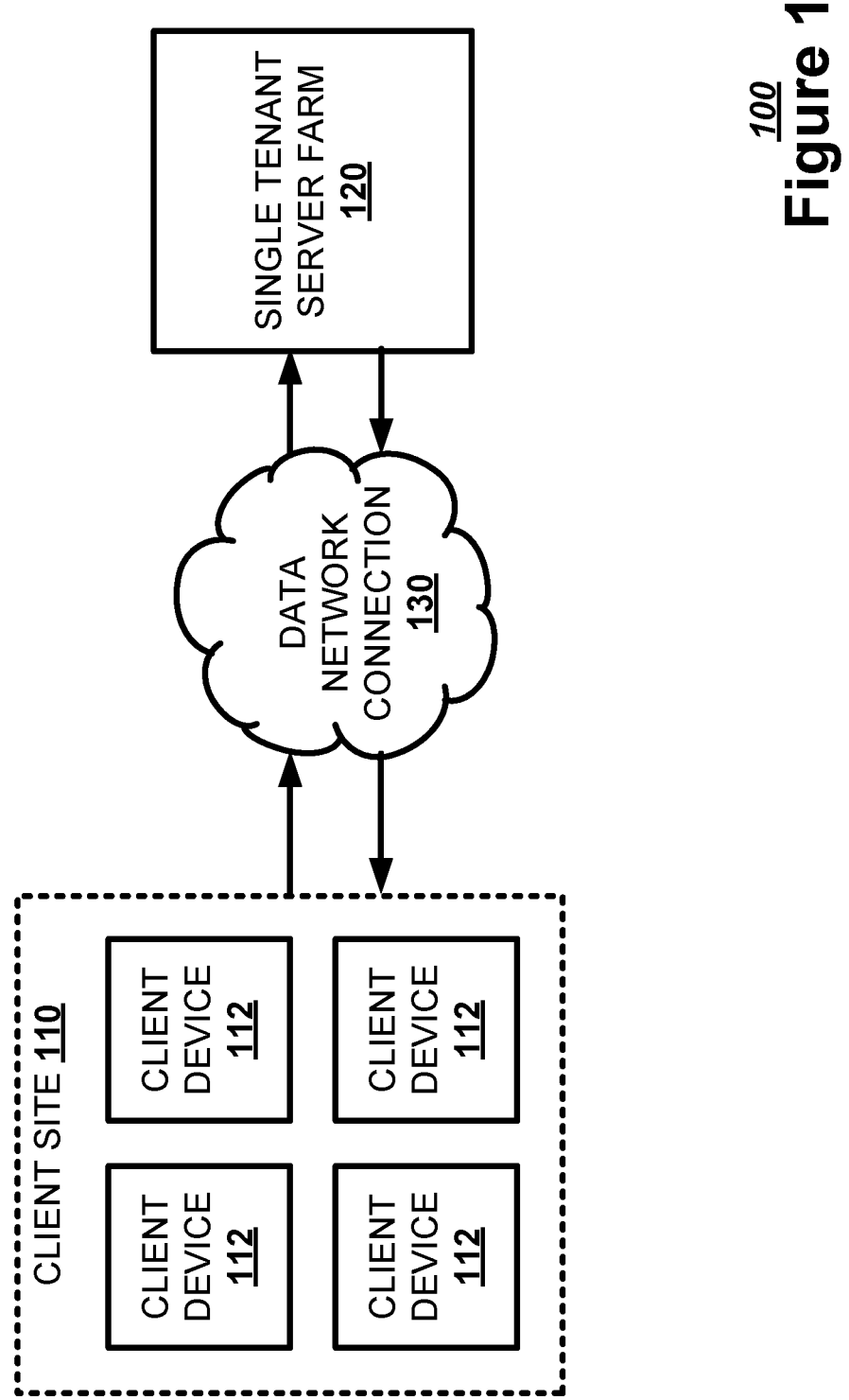
FIG. 1 illustrates, in a block diagram, one example of a data network for a single tenant service.

A server farm may provide service to a single tenant or multiple tenants. FIG. 1 illustrates, in a block diagram, one example of a data network 100 for a single tenant service. A client site 110 may have one or more client devices 112 that connect to a single tenant server farm 120 via a data network connection 130. The data network connection 130 may be an internet connection, a wide area network connection, a local area network connection, or other type of data network connections. The single tenant server farm 120 may have one or more servers dedicated to executing one or more network services for the single client site 110. Each client device 112 may execute a network service client to access the one or more network services or data maintained by the single tenant server farm 120. The network service client may be a separate application or integrated into an operating system or an internet browser platform. The single tenant server farm 120 may guarantee a set amount of resources to a client site 110. Further, the single tenant server farm 120 may more accurately track usage by the client site 110 to tailor the resources to the client site 110.

Figure 2:
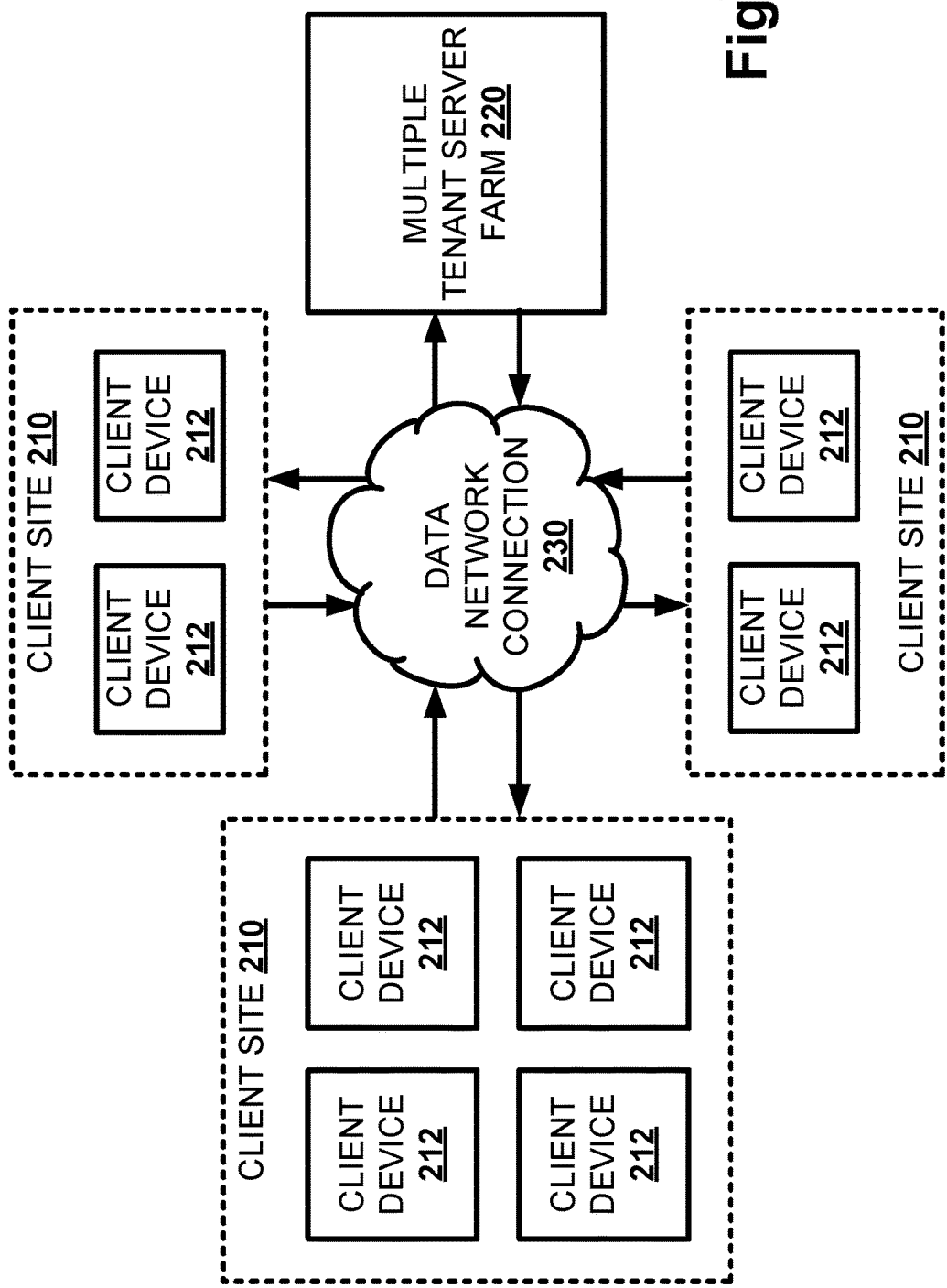
FIG. 2 illustrates, in a block diagram, one example of a data network for a multiple tenant service.

FIG. 2 illustrates, in a block diagram, one example of a data network 200 for a multiple tenant service. Multiple client sites 210 may share a multiple tenant server farm 220 via a data network connection 230. Each client site 210 may have one or more client devices 212. The multiple tenant server farm 220 may have one or more servers allocating one or more network services for each client site 210 based on client site usage. Each client device 212 may execute a network service client to access the one or more network services or data maintained by the multiple tenant server farm. The multiple tenant server farm 220 may efficiently and cheaply provide resources to the client sites 210 by redistributing resources from idle client sites 210 to active client sites 210. Thus, multiple tenant server farms 220 may tend to be more common than single tenant server farms.

Figure 3:
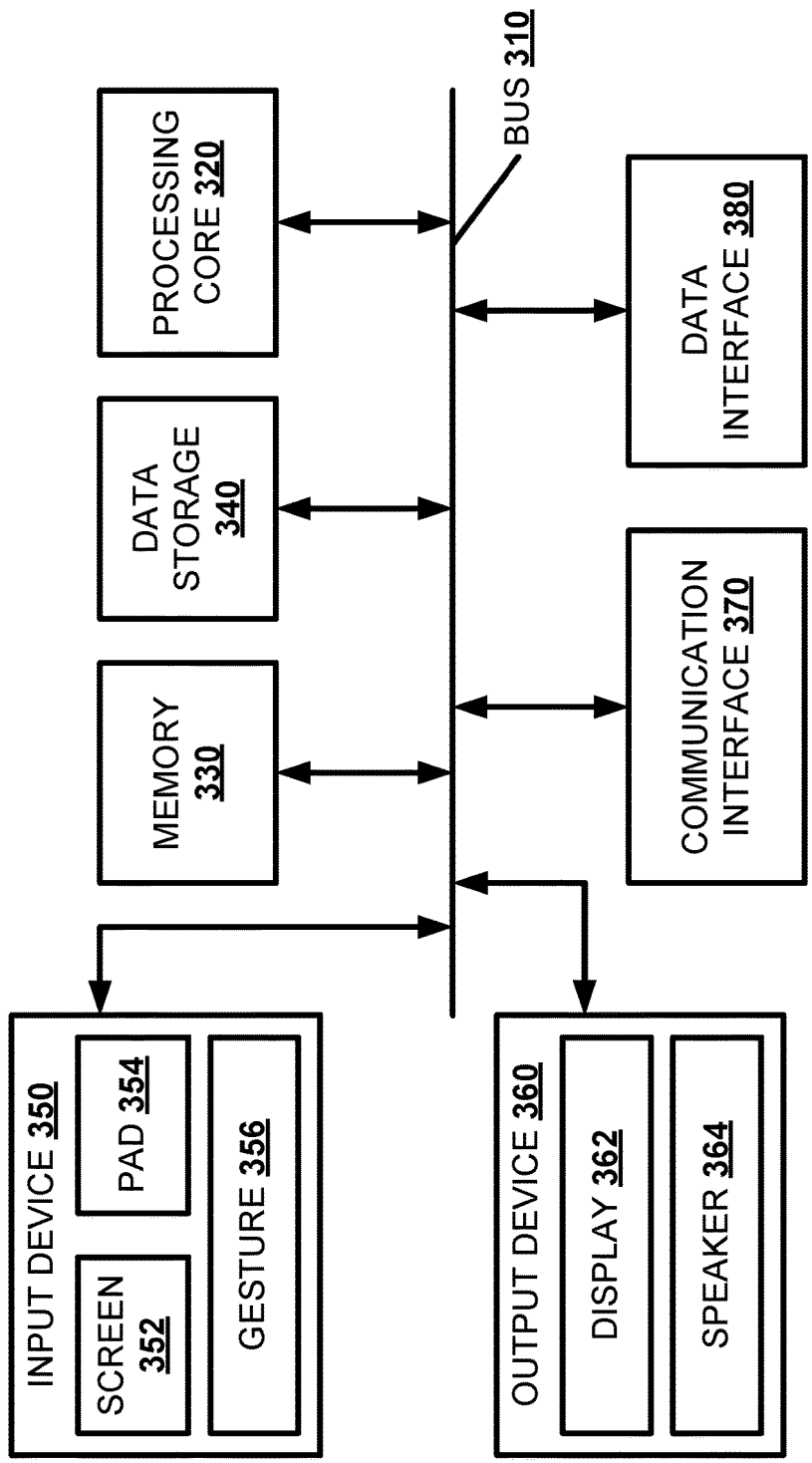
FIG. 3 illustrates, in a block diagram, one example of a computing device.

FIG. 3 illustrates a block diagram of an exemplary computing device 300 which may act as a server farm patching system. The computing device 300 may combine one or more of hardware, software, firmware, and system-on-a-chip technology to implement a server farm patching system. The computing device 300 may include a bus 310, a processing core 320, a memory 330, a data storage 340, an input device 350, an output device 360, a communication interface 370, and a data interface 380. The bus 310, or other component interconnection, may permit communication among the components of the computing device 300.

The processing core 320 may include at least one conventional processor or microprocessor that interprets and executes a set of instructions. The processing core 320 may determine a geographic location for the server farm to identify the off-peak usage time range. The processing core 320 may override the off-peak usage aggressiveness level upon receiving an administrator override.

The processing core 320 may analyze a request-per-second history for the server farm to identify the off-peak usage time range. The processing core 320 may adjust the off-peak usage time range based on a current request-per-second report for the server farm. The processing core 320 may adjust a patching aggressiveness level based on a proximity to an off-peak usage time range bound. The processing core 320 may adjust a patching aggressiveness level based on a current request-per-second report.

The processing core 320 may validate the patch code set based on an execution of the patch code set in an execution environment for a server application incorporating the patch code set. The processing core 320 may rate the patch code set based on at least one of a build age and a regression history for the patch code set. The processing core 320 may assign a farm temperature to the server farm describing a server characteristic used to determine when to deploy the patch code set to the server farm. The processing core 320 may schedule a deployment of the patch code set based on a farm temperature for the server farm. The processing core 320 may schedule patching a server farm with a lower temperature before patching a server farm with a higher temperature.

The memory 330 may be a random access memory (RAM) or another type of dynamic data storage that stores information and instructions for execution by the processing core 320. The memory 330 may also store temporary variables or other intermediate information used during execution of instructions by the processing core 320. The memory 330 may store a series of instructions to apply a patch code set to a server farm. The memory 330 may identify an off-peak usage time range for a server farm describing when the server farm has an activity level below an activity threshold. The memory 330 may declaratively define the off-peak usage time range in a network container object describing the server farm. The memory 330 may designate the server farm as a single tenant server farm dedicated to a single client. The memory 330 may declaratively define a tenant mandated off-peak usage time range in a network container object describing a single tenant server farm. The memory 330 may associate a geographic region for the server farm with the patch code set for the server farm. The memory 330 may mark the patch code set upon a regression occurrence indicating that the patch code set had to be removed to revert a server application to an earlier version.

The data storage 340 may include a conventional ROM device or another type of static data storage that stores static information and instructions for the processing core 320. The data storage 340 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 340 may store a set of instructions detailing a method that when executed by one or more processors cause the one or more processors to perform the method. The data storage 340 may also be a database or a database interface for storing a patch code package or a network container object.

The input device 350 may include one or more conventional mechanisms that permit a user to input information to the computing device 300, such as a keyboard, a mouse, a voice recognition device, a microphone, a headset, a touch screen 352, a touch pad 354, a gesture recognition device 356, etc. The output device 360 may include one or more conventional mechanisms that output information to the user, including a display screen 362, a printer, one or more speakers 364, a headset, a vibrator, or a medium, such as a memory, or a magnetic or optical disk and a corresponding disk drive.

The communication interface 370 may include any transceiver-like mechanism that enables computing device 300 to communicate with other devices or networks. The communication interface 370 may include a network interface or a transceiver interface. The communication interface 370 may be a wireless, wired, or optical interface.

A data interface 380 may transmit data, patches, or software actions, such as calls, between the computing device 300 and other computing devices 300. The data interface 380 may apply a patch code set at an off-peak usage patching aggressiveness level indicating an off-peak upper bound percentage of servers in the server farm receiving the patch code set when within the off-peak usage time range. The data interface 380 may apply the patch code set at a peak usage patching aggressiveness level indicating a peak upper bound percentage of servers in the server farm receiving the patch code set when outside the off-peak usage time range. The data interface 380 may apply the patch code set at a pre-set shoulder patching aggressiveness level to the server farm proximate to an off-peak usage time range bound. The data interface 380 may place a patching bid for the patch code set for the server farm requesting to apply the patch code set.

The computing device 300 may perform such functions in response to processing core 320 executing sequences of instructions contained in a computer-readable medium, such as, for example, the memory 330, a magnetic disk, or an optical disk. Such instructions may be read into the memory 330 from another computer-readable medium, such as the data storage 340, or from a separate device via the communication interface 360.

Figure 4:
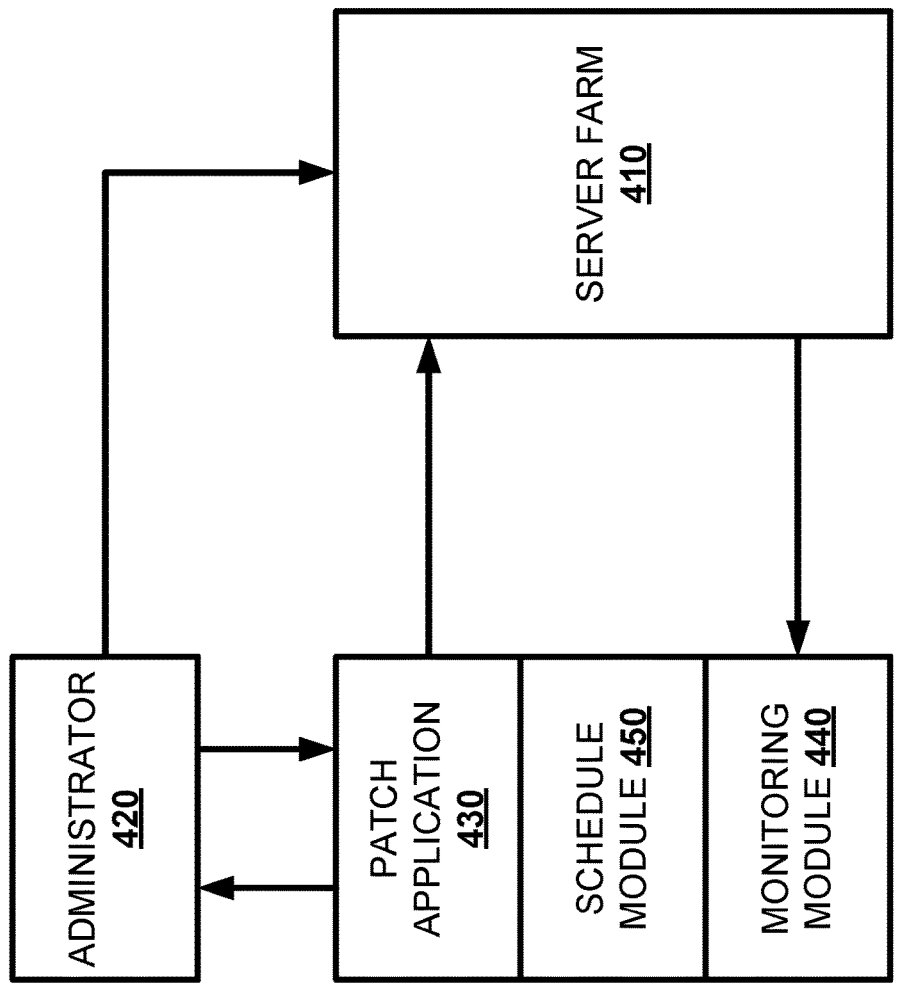
FIG. 4 illustrates, in a block diagram, one example of a server farm patching system architecture.

FIG. 4 illustrates, in a block diagram, one example of a server farm patching system architecture 400. The server farm 410 may be a collection of servers that act to provide one or more network services to one or more client sites. An administrator 420 may update a server farm 410 by applying a patch to one or more servers in the server farm 410. The administrator 420 may use a patch application module 430 to apply a patch to multiple servers in the server farm 410. The patch application module 430 may be a separate server that interacts with the other servers in the server farm 410 or an application that moves from server to server. The patch application module 430 may be self-actualizing code within the patch code set. The patch application module 430 may apply the patch code set to the server farm 410 in groups of servers based on a patching aggressiveness level. The patching aggressiveness level may describe either a number of servers or a percentage of servers in the server farm.

A monitoring module 440 may monitor the application of the patch to track performance and detect any patching error. A patching error is an application malfunction caused by the patch or the application of the patch. The monitoring module 440 may alert the patch application module 430 upon the detection of a patching error. The monitoring module 440 may be programmatically integrated with the patch application module 430, allowing the monitoring module 440 to directly interact with the patch application module 430. The monitoring module 440 may send an error notice about the patching error via a data communication or an application programming interface call. The monitoring module 440 may also monitor the overall performance of the server farm, based on a variety of performance metrics. The monitoring module 440 may use the overall server farm performance to fine tune the patching aggressiveness level or to adjust the activity threshold.

Upon receiving an error notice describing the patching error from a monitoring module 440, the patch application module 430 may automatically execute a response action to the patching error. The patch application module 430 may pause the patch application in response to the patching error. The patch application module 430 may alert an administrator to the patching error. The patch application module 430 may regress a server application to the state of the server application to prior to the deployment. The patch application module 430 may mark the patch code set upon the regression occurrence.

A schedule module 450 may identify when a server farm 410 is operating at peak activity. The patch application module 430 may use the schedule module 450 to deploy the patch code set at a time when the server farm 410 is operating at a low level of activity, to prevent interference with client activity. The schedule module 450 may create an off-peak usage time range indicating when the low level of activity is occurring. The schedule module 450 may store a static off-peak usage time range based on the geographic location of the server farm 410. The schedule module 450 may declaratively define the off-peak usage time range in a network container object describing the server farm. Alternately, the schedule module 450 may collect request-per-second reports for a server farm to create a request-per-second history. The schedule module 450 may then use the request-per-second history to dynamically determine the off-peak usage time range. The schedule module 450 may adjust the off-peak usage time range based on current request-per-second reports.

Figure 5:
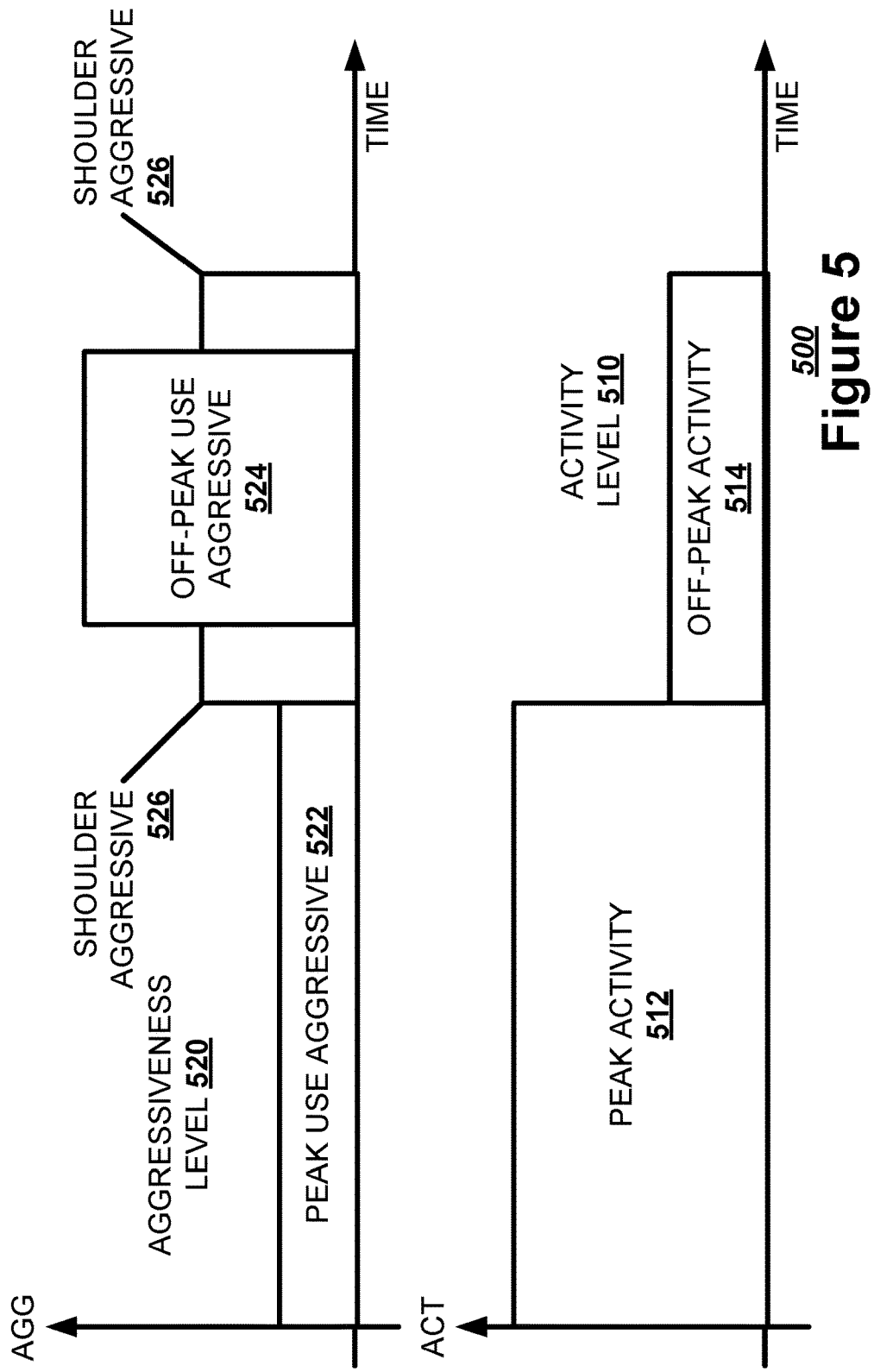
FIG. 5 illustrates, in a timeline graph, one example of a static off-peak deployment.

The server farm patching system may pre-set a static off-peak usage time range. FIG. 5 illustrates, in a timeline graph, one example of a static off-peak deployment 500. A server farm patching system may use the activity level 510 at the server farm to determine the aggressiveness level 520 of the deployment of the patch code set. The activity level 510 describes the number of requests from client sites processed by the server farm. During a peak activity period 512, the server farm may process more than a threshold number of requests from client sites. The threshold number of requests may be pre-set by an administrator based on an analysis of the overall server farm performance. During an off-peak activity period 514, the server farm may process less than a threshold number of requests from client sites. The server farm patching system may use the geographic location to identify a static peak activity period 512 for the server farm based on a statistical analysis for the region containing the server farm. A system administrator may make the statistical analysis for the activity level of the geographic region to determine the off-peak activity period 514. For example, the system administrator may divide the server farms controlled by that system administrator into an Asia-Pacifica region, a Europe-Africa region, and an Americas region. For a given mean time, the system administrator may designate the off-peak activity period 514 for the Asia-Pacifica region as 7 am-1 pm or 11 pm-5 am, the European-Africa region as 3 pm-9 pm or 7 am-1 pm, and the Americas region as 10 pm-4 am or 3 pm-9 pm.

Alternately, the server farm patching system may designate the server farm as a single tenant server farm. As the server farm is dedicated to a single tenant, a system administrator may receive from that tenant specific instructions as to when the off-peak activity period 514 is to occur for that server farm. Further, if that tenant knows of an occasion when a great deal of client activity is to occur during a nominal off-peak activity period 514, the server farm patching system may make a special adjustment for that event.

The aggressiveness level 520 indicates an upper bound percentage of servers in the server farm receiving the patch code set. During peak activity 512, the server farm patching system may apply a patch code set at a peak usage patching aggressiveness level 522 indicating a peak upper bound percentage of servers in the server farm receiving the patch code set. Generally, the server patching system may forgo applying any patch code sets to the server farm application during peak activity 512. Thus, the peak usage patching aggressiveness level 522 may be zero. During off-peak activity 514, the server farm patching system may apply the patch code set at an off-peak usage patching aggressiveness level 524 indicating a peak upper bound percentage of servers in the server farm receiving the patch code set. The off-peak usage patching aggressiveness level 524 may be greater than the peak usage patching aggressiveness level. Even as the determination for the time range is static, the server farm patching system may continually adjust the patching aggressiveness level. For example, the server farm patching system may lower the patching aggressiveness level as the server farm leaves the off-peak usage time range. The server farm patching system may apply the patch code set at a slightly reduced pre-set shoulder patching aggressiveness level 526 to the server farm during a shoulder time range proximate to an off-peak usage time range bound.

Figure 6:
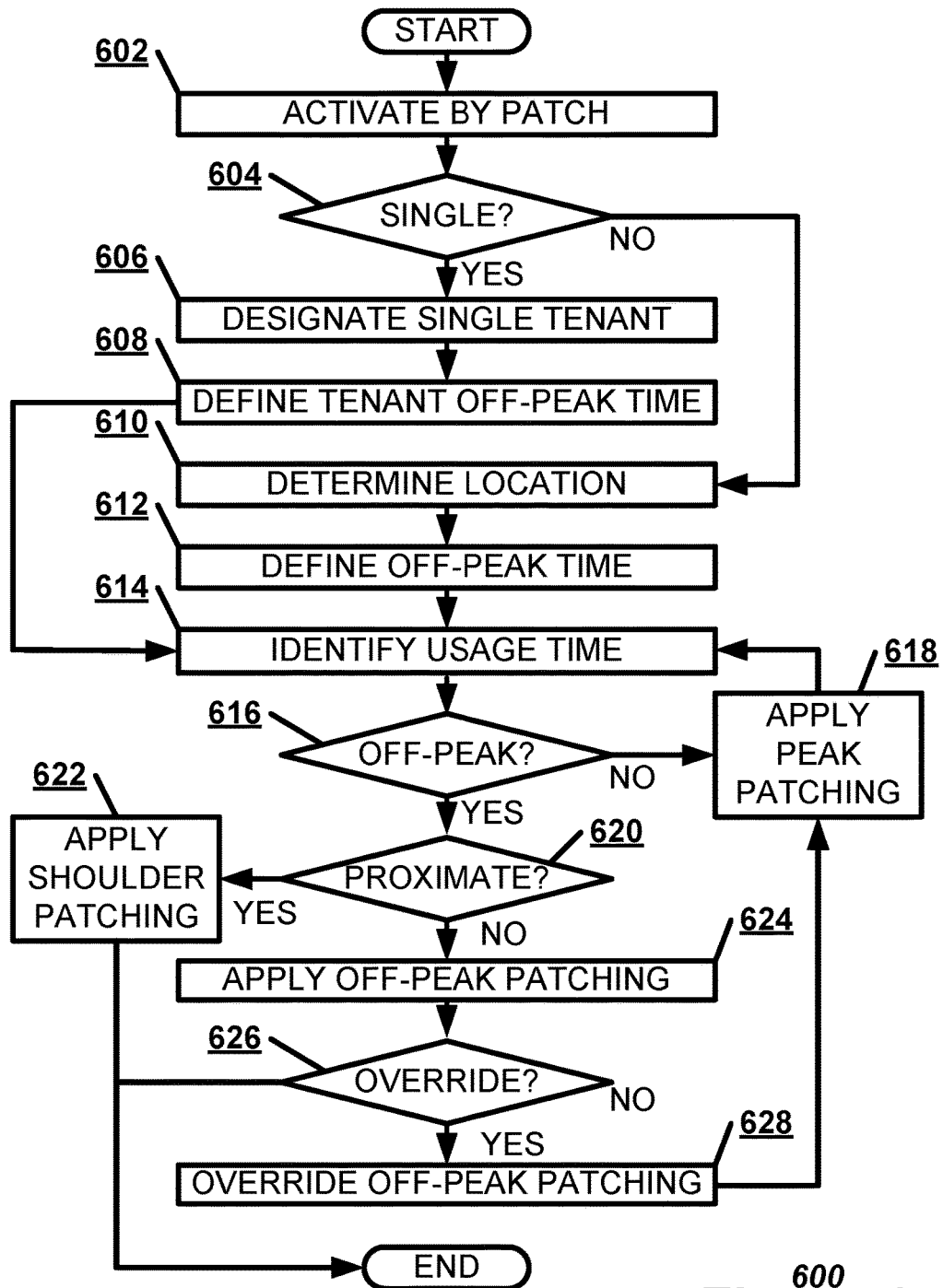
FIG. 6 illustrates, in a flowchart, one example of a method for applying a static off-peak deployment.

A server farm patching system may make a one-time determination for an off-peak usage time range for a server farm. FIG. 6 illustrates, in a flowchart, one example of a method 600 for applying a static off-peak deployment. The server farm patching system may be activated by a patch code set for a server farm (Block 602). If the server farm is a single tenant server farm (Block 604), the server farm patching system may designate the server farm as a single tenant server farm dedicated to a single client (Block 606). The server farm patching system may declaratively define a single tenant off-peak usage time range in a network container object describing the server farm (Block 608). Otherwise, the server farm patching system may determine a geographic location for the server farm to identify the off-peak usage time range for the server farm describing when the server farm has an activity level below an activity threshold (Block 610). The server farm patching system may declaratively define the off-peak usage time range in a network container object describing the server farm (Block 612). The server farm patching system may identify an off-peak usage time range for a server farm describing when the server farm has an activity level below an activity threshold (Block 614).

If the current time is outside the off-peak usage time range (Block 616), the server farm patching system may apply the patch code set at a peak usage patching aggressiveness level indicating a peak upper bound percentage of servers in the server farm receiving the patch code set when outside the off-peak usage time range (Block 618). As the upper bound percentage is generally small to zero, the server farm patching system may be unable to complete the deployment at this patching aggressiveness level. Thus, the server farm patching system may enter a holding pattern until the off-peak usage time range. If the current time is proximate to an off-peak usage time range bound for the off-peak time range (Block 620), the server farm patching system may apply the patch code set at a pre-set shoulder patching aggressiveness level to the server farm proximate to an off-peak usage time range bound (Block 622). Otherwise, the server farm patching system may apply the patch code set at an off-peak usage patching aggressiveness level indicating an off-peak upper bound percentage of servers in the server farm receiving the patch code set when within the off-peak usage time range (Block 624). If the server farm patching system receives an administrative override from a patching administrator (Block 626), the server farm patching system may override the off-peak usage aggressiveness level upon receiving an administrator override (Block 628).

Figure 7:
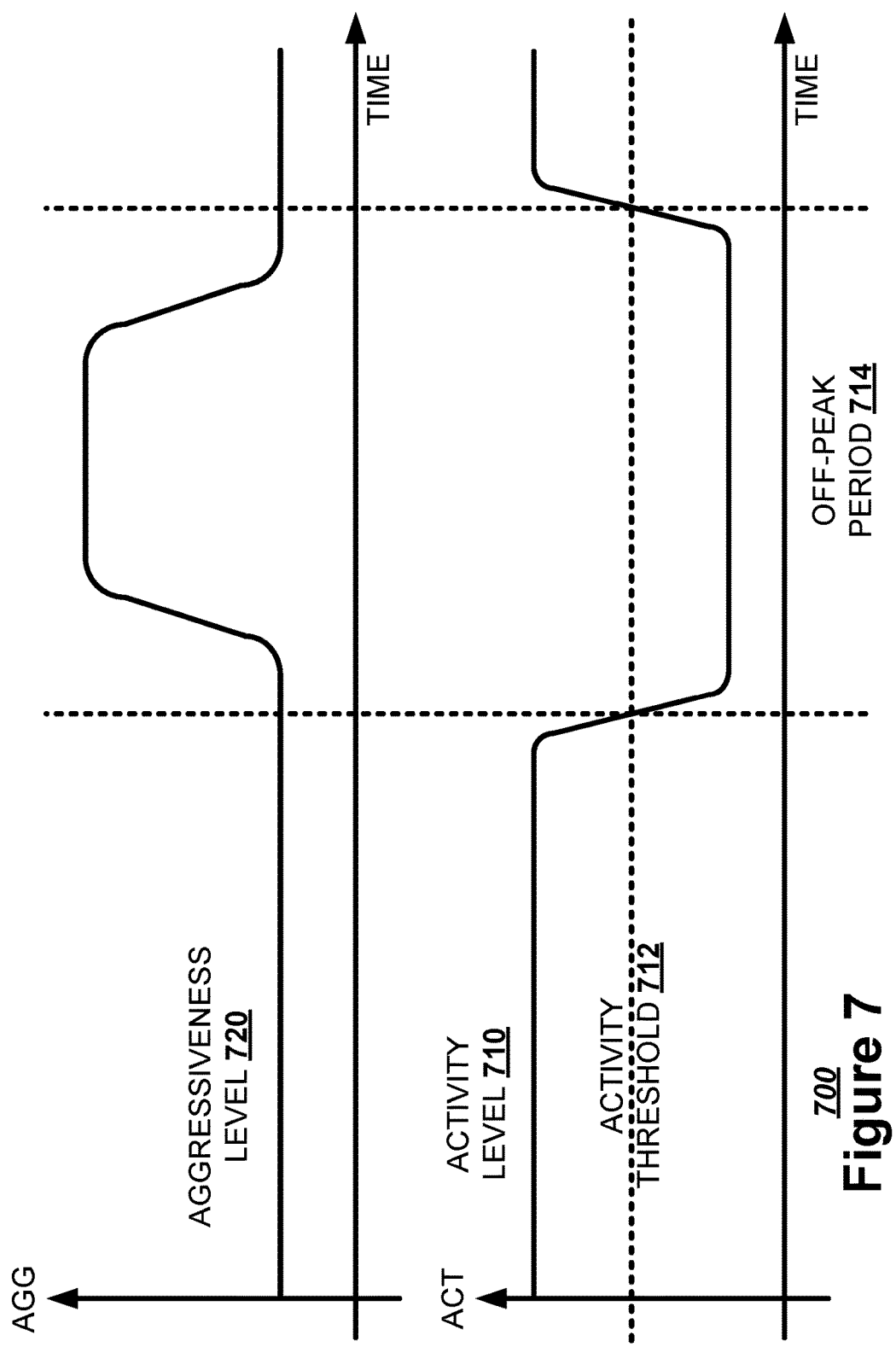
FIG. 7 illustrates, in a timeline graph, one example of a dynamic off-peak deployment.

Alternately, the server farm patching system may dynamically determine an off-peak usage time range. FIG. 7 illustrates, in a timeline graph, one example of a dynamic off-peak deployment 700. A server farm patching system may measure the activity level 710 for a region in real time based on the request-per-second reports recorded at each server farm in the region. If the number of requests for a specific server farm drops below a specified activity threshold 712, the server farm patching system may identify that server farm as entering an off-peak activity period 714. For a single tenant farm, the server farm patching system may measure the request-per-second reports for just that tenant.

While in that off-peak activity period 714, the server farm patching system may increase the patching aggressiveness level 720 from a peak usage patching aggressiveness level to the an off-peak usage patching aggressiveness level. The patching aggressiveness level 720 indicates an upper bound percentage of servers in the server farm receiving the patch code set. The peak usage patching aggressiveness level 720 may tend to be a low percentage of servers while the off-peak usage patching aggressiveness level 720 may tend to be a higher percentage of servers. Often, the peak usage patching aggressiveness level 720 may be zero, to avoid interfering with the operation of the server farm. The off-peak usage patching aggressiveness level 720 may still be a low enough percentage to allow for the continued operation of the server farm. Further, the server farm patching system may use the activity level 710 to determine the patching aggressiveness level 720. For example, a modest off-peak usage activity level 710 may result in an off-peak usage patching aggressiveness level 720 of twenty percent, while a lower off-peak usage activity level 710 may result in an off-peak usage patching aggressiveness level 720 of thirty percent.

Figure 8:
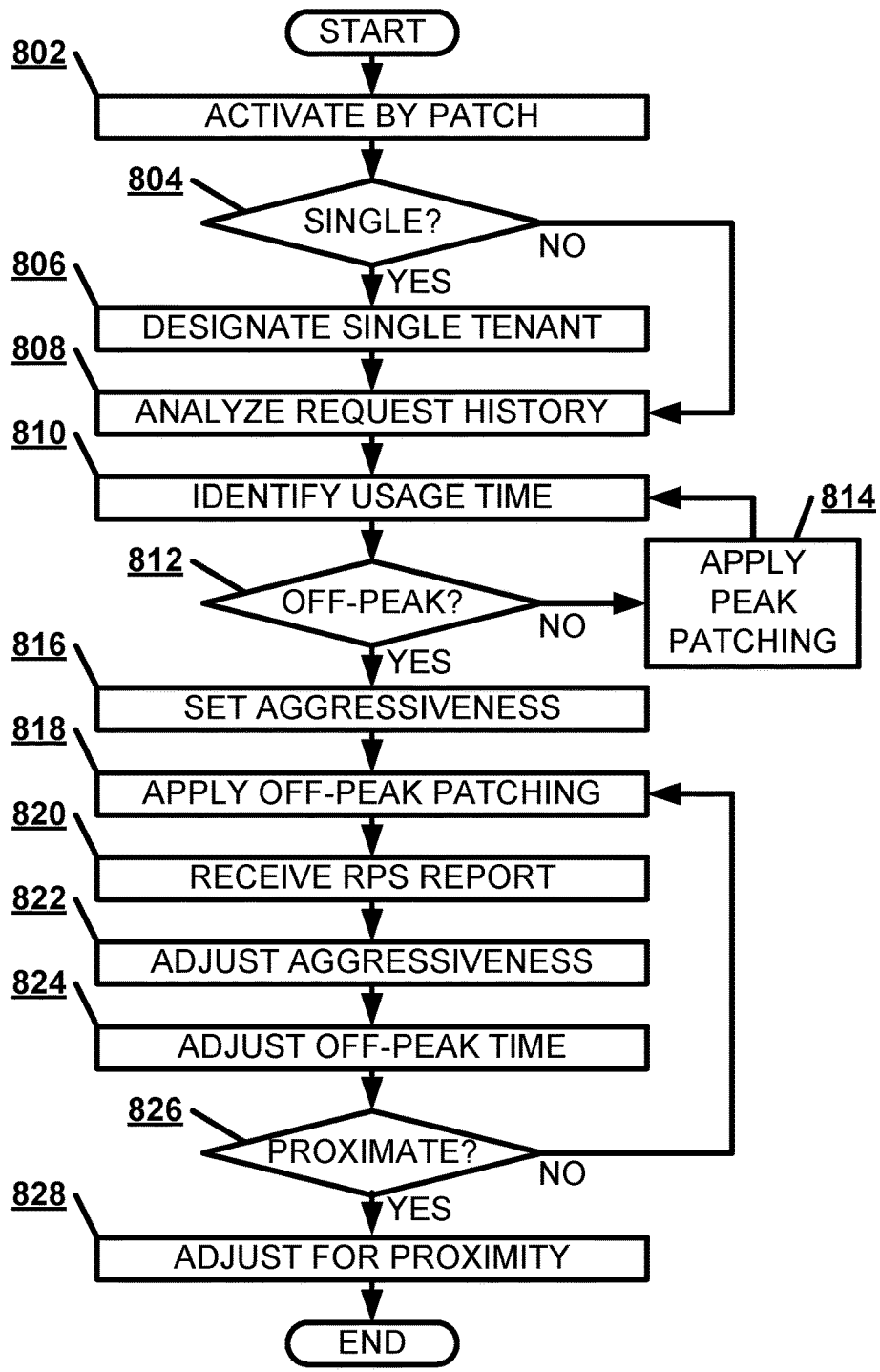
FIG. 8 illustrates, in a flowchart, one example of a method for applying a dynamic off-peak deployment.

FIG. 8 illustrates, in a flowchart, one example of a method 800 for applying a dynamic off-peak deployment. The server farm patching system may be activated by a patch code set for a server farm (Block 802). If the server farm is a single tenant server farm (Block 804), the server farm patching system may designate the server farm as a single tenant server farm dedicated to a single client (Block 806). The server farm patching system may analyze a request-per-second history for the server farm to identify the off-peak usage time range for the server farm describing when the server farm has an activity level below an activity threshold (Block 808). The server farm patching system may identify an off-peak usage time range for a server farm describing when the server farm has an activity level below an activity threshold (Block 810). If the current time is outside the off-peak time range (Block 812), the server farm patching system may apply the patch code set at a peak usage patching aggressiveness level indicating a peak upper bound percentage of servers in the server farm receiving the patch code set when outside the off-peak usage time range (Block 814). As the upper bound percentage is generally small to zero, the server farm patching system may be unable to complete the deployment of the patch code set at this patching aggressiveness level. Thus, the server farm patching system may enter a holding pattern until the off-peak usage time range.

The server farm patching system may set an off-peak usage patching aggressiveness level indicating an off-peak upper bound percentage of servers in the server farm receiving a patch code set when within the off-peak usage time range based on the request-per-second history for the server farm (Block 816). The server farm patching system may apply the patch code set at the off-peak usage patching aggressiveness level indicating an off-peak upper bound percentage of servers in the server farm receiving the patch code set when within the off-peak usage time range (Block 818). The server farm patching system may receive a current request-per-second (RPS) report from the server farm (Block 820). The server farm patching system may adjust a patching aggressiveness level based on the current request-per-second report (Block 822). The server farm patching system may adjust the off-peak usage time range based on the current request-per-second report for the server farm (Block 824). If the current time is proximate to an off-peak usage time range bound for the off-peak time range (Block 826), the server farm patching system may adjust a patching aggressiveness level based on a proximity to an off-peak usage time range bound (Block 828).

FIG. 9 illustrates, in a block diagram, one example of a patching code package 900. The patching code package 900 may have a code identifier (ID) 910 to identify the patching code. The patching code package 900 may have a version number 920 to identify which version of the patching code is container in the package. The patching code package 900 may have a patch code set 930 for application to the server application. The patching code package 900 may have a geographic region field 940 to indicate that the patch code set 930 is to be applied to server farms in the listed geographic region. The patching code package 900 may have a build age field 950 indicating when the patch code set 930 was compiled for application. The patching code package 900 may have a regression history field 960 describing any regressions caused by application of the patch code set 930.

FIG. 10 illustrates, in a block diagram, one example of a network container object 1000 used to describe the server farm to the server farm patching system. The network container object 1000 may have a server farm identifier 1010 identifying the server farm described by the network container object 1000. The network container object 1000 may have an array of one or more server identifiers 1020 identifying servers present in the server farm. The network container object 1000 may have a geographic location field 1030 describing the geographic location of the server farm. The network container object 1000 may have a single tenant flag 1040 that indicates if the server farm is a single tenant server farm dedicated to a single client. The network container object 1000 may have an off-peak usage time range start time 1050 indicating when the off-peak usage time range for that server time starts. The network container object 1000 may have an off-peak usage time range stop time 1060 indicating when the off-peak usage time range for that server time ends.

The network container object 1000 may have a farm temperature rating 1070 describing a farm temperature for the server farm. A farm temperature describes a server characteristic that the server farm patching system may use to determine a patching order. For example, the server may support a critical system or performs a highly visible function, so that the server is patched after other servers to determine whether the patch causes errors. Alternately, the server may be a part of a server farm that services a crucial client, indicating servers from other server farms are to be patched before servers from the identified server farm.

By dividing the server farms into geographic regions, a server farm control network may track new versions of a patch code set to be applied to the server applications as those new versions are built and rolled out. FIG. 11a illustrates, in a time line, one example of a preliminary arrangement prior to an initial deployment 1100. The server farm control network may divide a set of server farms into different server farm groups 1102 based on geographic regions. For example, the server farm control network may group server farms in the Asia-Pacific region into Group 1 1102, server farms in the Europe-Africa region into Group 2 1102, and server farms in the Americas into Group 3 1102. The server farm control network may assign each server farm group 1102 an off-peak usage time range 1104 during which a server farm patching system may apply a patch code set to the server applications being run by servers on the server farm. In the previous example, the server farm control network may assign a Range 1 of 7 am-1 pm mean time to Group 1 1102, a Range 2 of 3 pm-9 pm mean time to Group 2 1102, and a Range 3 of 10 pm-4 am mean time to Group 3 1102. When the current time 1106 is after a first version of the patch code set has been built but prior to the off-peak usage time ranges 1104 for all three groups 1102, each group 1102 may have a status of waiting for Version 1 of the patch code set.

FIG. 11*b* illustrates, in a time line, one example of a Group 1 1102 patching 1120. The current time 1106 is within Range 1 1104 for Group 1 1102. Group 1 1102 may have a status of patching Version 1 of the patch code set. Group 2 1102 and Group 3 1102 may have a status of waiting for Version 1 of the patch code set.

FIG. 11*c* illustrates, in a time line, one example of a post version 2 build 1140. The current time 1106 is after Range 1 1104 for Group 1 1102. The current time 1106 may also be after a build of Version 2 of the patch code set. Group 2 1102 and Group 3 1102 may have a status of waiting for Version 2 of the patch code set. Group 1 1102 also may have a status of waiting for Version 2 of the patch code set, even though Version 1 has already been applied.

FIG. 11*d* illustrates, in a time line, one example of a Group 2 1102 patching 1160. The current time 1106 is within Range 2 1104 for Group 2 1102. Group 2 1102 may have a status of patching Version 2 of the patch code set. Group 1 1102 and Group 3 1102 may have a status of waiting for Version 2 of the patch code set.

Figure 11E:
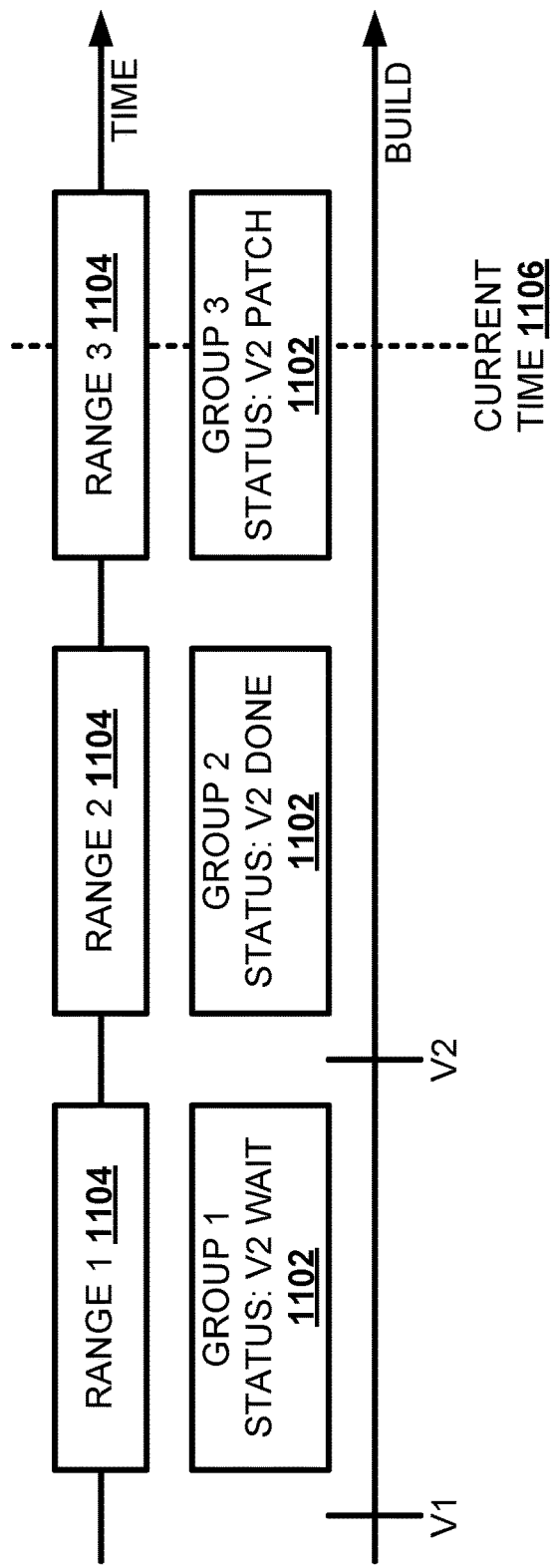

FIG. 11*e* illustrates, in a time line, one example of a Group 3 1102 patching 1180. The current time 1106 is within Range 3 1104 for Group 3 1102. Group 3 1102 may have a status of patching Version 2 of the patch code set. Group 1 1102 may have a status of waiting for Version 2 of the patch code set. Group 2 1102 may have a status of being done with patching Version 2 of the patch code set.

FIG. 12 illustrates, in a flowchart, one example of a method 1200 for applying a patch code set. The server farm patching system may associate a geographic region for a server farm with a patch code set for the server farm (Block 1202). The server farm patching system may validate the patch code set based on an execution of the patch code set in an execution environment for a server application incorporating the patch code set (Block 1204). The server farm patching system may rate the patch code set based on at least one of a build age and a regression history for the patch code set (Block 1206). The server farm patching system may assign a farm temperature to the server farm describing a server characteristic used to determine when to deploy the patch code set on the server farm (Block 1208). The server farm patching system may schedule a deployment of the patch code set based on a farm temperature for the server farm (Block 1210). The server farm patching system may place a patching bid for the patch code set for the server farm requesting to apply the patch code set. (Block 1212). If the server farm accepts the patching bid (Block 1214), the server farm patching system may apply the patch code set to the server application on the servers of the server farm (Block 1216). If the patch code set creates an error causing the server farm patching system to regress the deployment of the patch code set (Block 1218), the server farm patching system may mark the patch code set upon a regression occurrence indicating that the patch code set had to be removed to revert a server application to an earlier version (Block 1220).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A server farm patching system comprising:
a processor;
a memory in communication with the processor, the memory storing instructions that, when executed by the processor, causes the server farm patching system to identify an off-peak usage time range for a server farm having a plurality of servers, the off-peak usage time range describing when the server farm has an activity level below an activity threshold; and
a data interface configured to apply a patch code set to one of the plurality of servers in the server farm;
wherein the data interface is configured such that:
the patch code set is applied at an off-peak usage aggressiveness level when the server farm is operating within the off-peak usage time range, the off-peak usage aggressiveness level indicating an off-peak upper bound percentage of servers in the server farm receiving the patch code set when within the off-peak usage time range, and
the patch code set is applied at a peak usage aggressiveness level when the server farm is operating outside the off-peak usage time range, the peak usage aggressiveness level indicating a peak upper bound percentage of servers in the server farm receiving the patch code set when outside the off-peak usage time range.

2. The server farm patching system of claim 1,
wherein the instructions further cause the server farm patching system to determine a geographic location for the server farm to identify the off-peak usage time range.

3. The server farm patching system of claim 1, wherein the memory is configured to define the off-peak usage time range in a network container object describing the server farm.

4. The server farm patching system of claim 1, wherein the memory is configured to designate the server farm as a single tenant server farm dedicated to a single client.

5. The server farm patching system of claim 1, wherein the memory is configured to define a tenant mandated off-peak usage time range in a network container object describing a single tenant server farm.

6. The server farm patching system of claim 1, wherein the data interface is further configured to apply the patch code set at a pre-set shoulder aggressiveness level to the server farm proximate to an off-peak usage time range bound.

7. The server farm patching system of claim 1,
wherein the instructions further cause the server farm patching system to override the off-peak usage aggressiveness level upon receiving an administrator override.

8. The server farm patching system of claim 1, wherein the memory is configured to associate a geographic region for the server farm with the patch code set for the server farm.

9. The server farm patching system of claim 1,
wherein the instructions further cause the server farm patching system to validate the patch code set based on an execution of the patch code set in an execution environment for a server application incorporating the patch code set.

10. The server farm patching system of claim 1,
wherein the instructions further cause the server farm patching system to rate the patch code set based on at least one of a build age and a regression history for the patch code set.

11. The server farm patching system of claim 1, wherein the data interface is further configured to place a patching bid for the patch code set for the server farm requesting to apply the patch code set.

12. The server farm patching system of claim 1,
wherein the instructions further cause the server farm patching system to assign a farm temperature to the server farm describing a server characteristic used to determine when to deploy the patch code set to the server farm.

13. The server farm patching of claim 1, further comprising:
wherein the instructions further cause the server farm patching system to schedule a deployment of the patch code set based on a farm temperature for the server farm.

14. The server farm patching system of claim 1, wherein the memory is configured to mark the patch code set upon a regression occurrence indicating that the patch code set had to be removed to revert server application to an earlier version.

15. A computing device comprising:
a processor;
a memory in communication with the processor, the memory storing a series of instructions that, when executed by the processor, cause the computing device to:
apply a patch code set to a server farm,
analyze a request-per-second history for the server farm to identify an off-peak usage time range for the sever farm describing when the server farm has an activity level below an activity threshold;
wherein:
the patch code set is applied at an off-peak usage aggressiveness level when the server farm is operating within the off-peak usage time range, the off-peak usage aggressiveness level indicating an off-peak upper bound percentage of servers in the server farm receiving the patch code set when within the off-peak usage time range, and
the patch code set is applied at a peak usage aggressiveness level when the server farm is operating outside the off-peak usage time range, the peak usage aggressiveness level indicating a peak upper bound percentage of servers in the server farm receiving the patch code set when outside the off-peak usage time range.

16. The computing device of claim 15, wherein the instructions further cause the computing device to adjust the off-peak usage time range based on a current request-per-second report for the server farm.

17. The computing device of claim 15, wherein the instructions further cause the computing device to adjust an aggressiveness level based on a proximity to an off-peak usage time range bound.

18. The computing device of claim 15, wherein the instructions further cause the computing device to adjust an aggressiveness level based on a current request-per-second report.

19. A method, comprising:
identifying an off-peak usage time range for a server farm having a plurality of servers, the off-peak usage time range describing when the server farm has an activity level below an activity threshold;

applying a patch code set to one of the plurality of servers in the server farm;

wherein:

the patch code set is applied at an off-peak usage aggressiveness level when the server farm is operating within the off-peak usage time range, the off-peak usage aggressiveness level indicating of an off-peak upper bound percentage of servers in the servers farm receiving the patch code set when within the off-peak usage time range, and the patch code set is applied at a peak usage aggressiveness level when the server farm is operating outside the off-peak usage time range, the peak usage aggressiveness level indicating a peak upper bound percentage of servers in the server farm receiving the patch code when outside the off-peak usage time range.

20. The method of claim 19, further comprising placing a patching bid for the patch code set for the server farm, the patching bid requesting to apply the patch code set.

\* \* \* \* \*